US008817102B2

(12) United States Patent
Saeki et al.

(10) Patent No.: US 8,817,102 B2
(45) Date of Patent: Aug. 26, 2014

(54) CAMERA LAYOUT DETERMINATION SUPPORT DEVICE

(75) Inventors: Takashi Saeki, Hitachinaka (JP); Ryo Yumiba, Tokai (JP); Masaya Itoh, Hitachinaka (JP); Takao Sukegawa, Yokohama (JP); Yasuhiro Suda, Hitachinaka (JP); Masanori Miyoshi, Mito (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 13/170,303

(22) Filed: Jun. 28, 2011

(65) Prior Publication Data
US 2011/0317016 A1 Dec. 29, 2011

(30) Foreign Application Priority Data

Jun. 28, 2010 (JP) ................................. 2010-145774

(51) Int. Cl.
*H04N 7/18* (2006.01)
*G08B 13/196* (2006.01)

(52) U.S. Cl.
CPC .... *G08B 13/19639* (2013.01); *G08B 13/19634* (2013.01); *G08B 13/19645* (2013.01); *G08B 13/19682* (2013.01); *G05B 2219/33045* (2013.01); *Y10S 706/921* (2013.01)
USPC .......................................... 348/154; 706/921

(58) Field of Classification Search
None
See application file for complete search history.

(56) References Cited

U.S. PATENT DOCUMENTS

| 8,482,609 B1* | 7/2013 | Mishra et al. ................. 348/144 |
| 2003/0169919 A1* | 9/2003 | Ikeda et al. ................... 382/159 |
| 2006/0268108 A1* | 11/2006 | Abraham ....................... 348/143 |
| 2010/0259529 A1* | 10/2010 | Nishi et al. .................... 345/212 |

FOREIGN PATENT DOCUMENTS

| CN | 101251925 | 8/2008 |
| JP | 2005-505209 | 2/2005 |
| JP | 2006-074260 | 3/2006 |
| WO | 03/030550 | 4/2003 |

OTHER PUBLICATIONS

Ugur Murat Erdem, Stan Sclaroff; "Automated camera layout to satisfy task-specific and floor plan-specific coverage requirements" Computer Vision and Image Understanding, vol. 103, Issue 3, Sep. 2006, pp. 156-169.*
CN Office Action for Chinese Application No. 201110169123.4, issued on May 28, 2013.

* cited by examiner

*Primary Examiner* — Sath V Perungavoor
*Assistant Examiner* — Tyler W Sullivan
(74) *Attorney, Agent, or Firm* — Antonelli, Terry, Stout & Kraus, LLP.

(57) ABSTRACT

A device which can support a determination of a camera layout by automatically preparing the camera layout that satisfies a customer request based on the customer request including a surveillance layout. Specifically, a need table that is a data set of a plurality of arrangement candidate cameras satisfying the customer request is prepared from the customer request including the surveillance layout. An arrangement of the plurality of the arrangement candidate cameras on a map is calculated based on the need table using a clustering method and a temporary layout of cameras is prepared. Then, an arrangement layout of the cameras in the surveillance layout is determined based on the temporary layout.

17 Claims, 13 Drawing Sheets

Block diagram of camera layout determination support device

Block diagram of camera layout need table preparation unit

Surveillance layout

Area layout

FIG.4A

One example of customer request table preparation

Area and desired function D20 in customer request

| Request 1 | Motion detect in all areas |
|---|---|
| Request 2 | Face detect only in area B |
| Request 3 | Staying detect only in area C |

FIG.4B

One example of customer request table preparation

Customer request table D60

| Area | Desired function | | | |
|---|---|---|---|---|
| Area label | Motion detect | Face detect | ··· | Staying detect |
| A | 1 | 0 | ··· | 0 |
| B | 1 | 1 | ··· | 0 |
| C | 1 | 0 | ··· | 1 |

FIG.5

One example of need table D70

| Candidate | Area | | | Desired function | | | | Section |
|---|---|---|---|---|---|---|---|---|
| | A | B | C | Motion detect | Face detect | ... | Staying detect | |
| (1) | 1 | 0 | 0 | 1 | 0 | 0 | 0 | Arrangement candidate camera based on customer request table |
| (2) | 0 | 1 | 0 | 1 | 1 | 0 | 0 | |
| (3) | 0 | 0 | 1 | 1 | 0 | 0 | 1 | |
| (4) | 1 | 0 | 0 | 0.9 | 0 | 0 | 0 | Added arrangement candidate camera in order to cover area |
| (5) | 0 | 1 | 0 | 0.9 | 0.95 | 0 | 0 | |
| (6) | 0 | 1 | 0 | 0.95 | 0.9 | 0 | 0 | |
| (7) | 0 | 0 | 1 | 0.95 | 0 | 0 | 1 | |

Block diagram of clustering unit T2

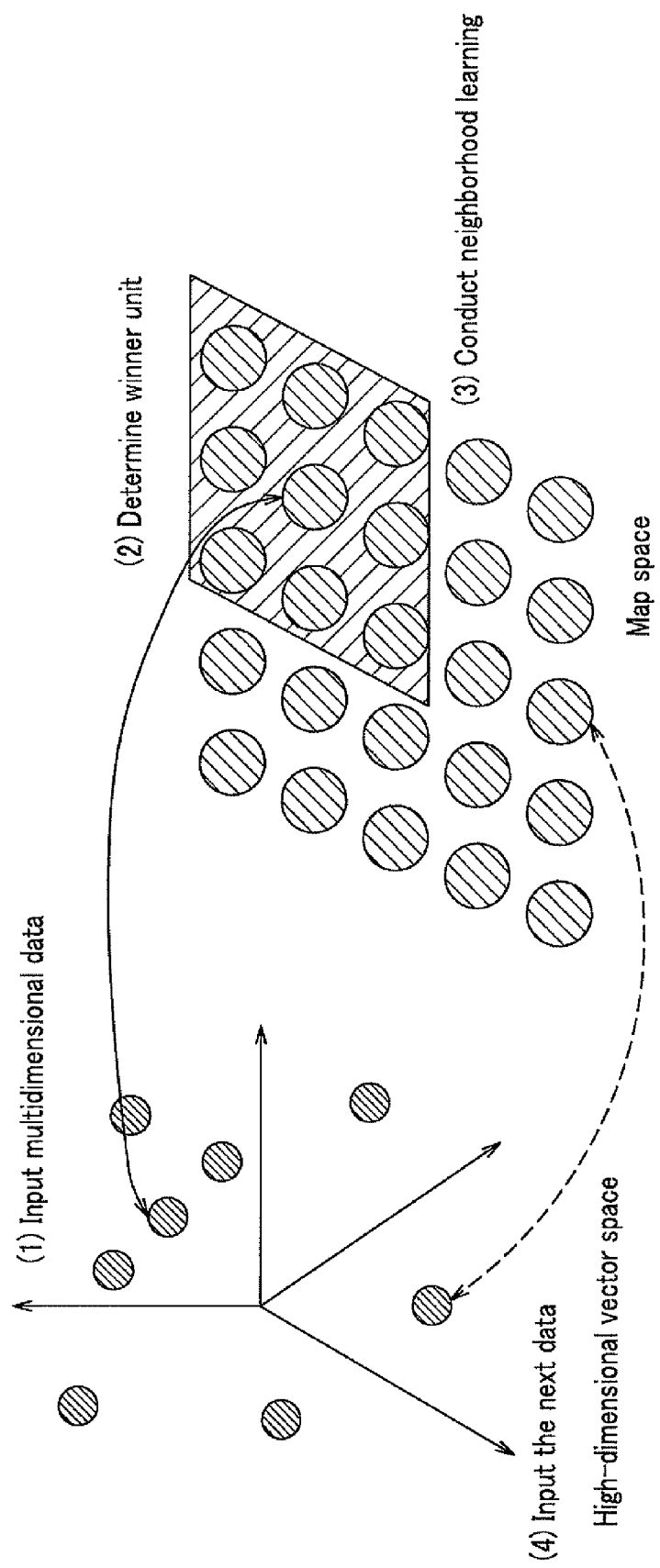

FIG.8A

Correspondence between area layout D50 and node in competitive layer

|  | Area | | |
|---|---|---|---|
| Node | A | B | C |
| A1 | 1 | 0 | 0 |
| A2 | 1 | 0.5 | 0 |
| A3 | 1 | 0 | 0.5 |
| A4 | 1 | 0.5 | 0.5 |
| B1 | 0 | 1 | 0 |
| B2 | 0.5 | 1 | 0 |
| B3 | 0 | 1 | 0.5 |
| B4 | 0.5 | 1 | 0.5 |
| C1 | 0 | 0 | 1 |
| C2 | 0.5 | 0 | 1 |
| C3 | 0 | 0.5 | 1 |
| C4 | 0.5 | 0.5 | 1 |

FIG.8B

Correspondence between area layout D50 and node in competitive layer

C

| C1 | C2 | A3 | A1 | A1 | A |
|---|---|---|---|---|---|
| C1 | C2 | A3 | A1 | A1 | |
| C3 | C4 | A4 | A2 | A2 | |
| B3 | B3 | B2 | B2 | B2 | |
| B1 | B1 | B1 | B1 | | |
| B1 | B1 | B1 | B | | |

Processing flow of SOM in the present embodiment

Block diagram of camera layout determination support device in EMBODIMENT 2

Application of camera layout determination support device

CAMERA LAYOUT DETERMINATION SUPPORT DEVICE

CROSS REFERENCE TO RELATED APPLICATIONS

This application claims the foreign priority benefit under Title 35, United States Code, §119(a)-(d) of Japanese Patent Application No. 2010-145774, filed on Jun. 28, 2010, the contents of which are hereby incorporated by reference.

BACKGROUND OF THE INVENTION

1. Field of the Invention

The present invention relates to a technology for determining a layout of a surveillance camera in response to a customer need.

2. Description of Related Art

In growing social anxiety due to repetitive atrocious crimes in recent years, introduction of a security system that conducts surveillance of a suspicious person by installing a surveillance camera in a place such as a store and a company, where many peoples come and go, has been increased. The security system is widely introduced from a small system, for example, for a private house to a large system, for example, for a large shopping center, an air port, and a local community. According to the application of the security system, a customer need, for example, for the total number of cameras, a total cost, a surveillance area, and a desired function is widely varied. Conventionally, in introducing the security system, a sales people makes a hearing to take a customer need and consults with an expert who actually conducts installation of the security system, and subsequently, the expert decides a camera layout and camera setting based on his know-how.

As a conventional method for automatically determining a camera layout, Japanese Patent Publication No. 2006-74260 describes a system that effectively arranges surveillance cameras in a car park, in which when the number of cameras for conducting surveillance of the car park is given in advance, a plurality of sets of camera installation condition are picked up and evaluation criteria for each set of the camera installation condition are calculated, then, an optimum set of the camera installation condition is determined based on the calculated evaluation criteria.

In addition, Japanese Patent Publication No. 2005-505209 describes a system that calculates a measure of effectiveness of a given camera layout and evaluates whether the layout is acceptable or not.

SUMMARY OF THE INVENTION

However, with respect to the method that a sales people hears a customer need and consults with an expert and the expert determines the camera layout and camera setting, there is such a problem that, for example, an accurate delivery of the customer need to the expert is difficult, an accuracy of the camera layout depends on technique of the expert, and effects of the proposed camera layout are hardly understood by the customer.

In addition, in the technology described in Japanese Patent Publication No. 2006-74260, a calculation of the evaluation criteria for each of the huge number of sets of the camera installation condition is required, and thereby the calculation cost for all sets becomes huge. Furthermore, the number of cameras must be given in advance.

In addition, in the technology described in Japanese Patent Publication No. 2005-505209, whether a camera layout is acceptable or not is only evaluated, then, the camera layout must be given.

The present invention has been developed in consideration of the foregoing problems, and it is an object of the present invention to provide a device which automatically generates a camera layout that satisfies a customer need based on the customer need including a surveillance layout, and which can support determination of the camera layout.

Meanwhile, problems other than those described above will be clarified by the description of the whole specification and/or drawings of the present invention.

In order to solve the foregoing problems, it is an object of the present invention to provide a camera layout determination support device that prepares a need table which is a data set of a plurality of arrangement candidate cameras satisfying a customer request from the customer request including a surveillance layout and calculates an arrangement of the arrangement candidate cameras on a map using a clustering method based on the need table, then, prepares a temporary layout of an arrangement of cameras and determines an arrangement layout of the cameras in the surveillance layout based on the temporary layout.

Meanwhile, the foregoing feature is just one example, and the present invention can be modified without departing from the spirit and nature of the present invention. In addition, an example of a feature of the present invention other than the foregoing example will be explained through descriptions and drawings of the whole specification of the instant application.

According to the camera layout determination support device of the present invention, a camera layout satisfying a customer request can be automatically prepared based on the customer request including a surveillance layout and can support determination of the camera layout. In addition, the camera layout that is optimum for surveillance need of the customer and has a minimum configuration can be determined. The other effects of the present invention will be explained through descriptions of the whole specification.

BRIEF DESCRIPTION OF THE DRAWINGS

FIG. 4A and FIG. 4B are illustrations showing one example of a customer request table preparation;

FIG. 5 is an illustration showing one example of a need table;

FIG. 7 is an illustration of a learning step of SOM (Self Organization Map);

FIG. 8A and FIG. 8B are illustrations showing a correspondence between an area layout and a node of a competitive layer;

DETAILED DESCRIPTION OF THE PREFERRED EMBODIMENT

Embodiments of the present invention will be explained in reference to drawings. Meanwhile, an element identical to or similar to the element in each drawing and embodiment is given the same reference, and the explanation thereof will be omitted.

[Embodiment 1]

Figure 1:
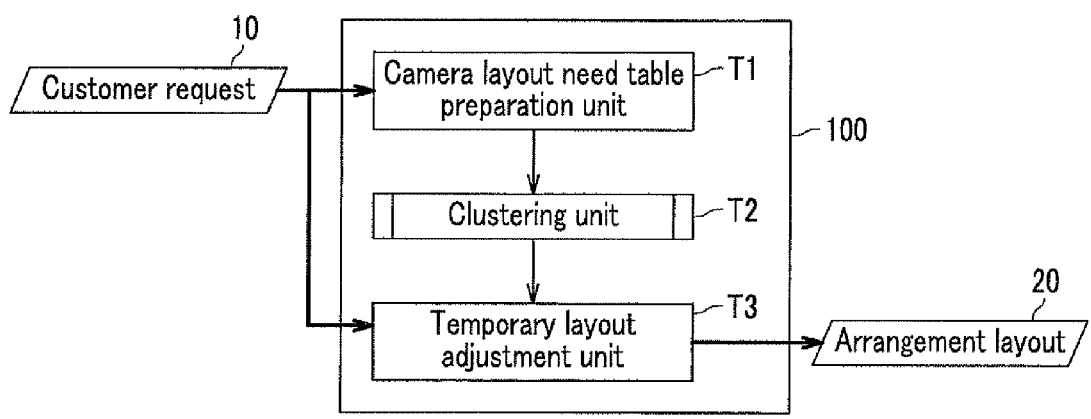
FIG. 1 is a block diagram showing one example of a camera layout determination support device according to EMBODIMENT 1 of the present invention.

FIG. 1 is a block diagram showing one example of a camera layout determination support device 100 according to EMBODIMENT 1 of the present invention. The camera layout determination support device 100 inputs a customer request 10 and outputs an arrangement layout 20 of surveillance cameras that satisfies the customer request 10. Here, the customer request 10 includes, for example, a surveillance layout showing a layout of surveillance area, a desired function required for a camera in a given area in the surveillance layout (hereinafter, referred to as area & desired function), a resolution of camera image, or the number of surveillance cameras. The arrangement layout 20 is a layout showing an optimum camera arrangement that satisfies the customer request 10. The arrangement layout 20 includes information of, for example, a camera type (including functions such as a detection function, a resolution, and a wide angle function), a camera location, a camera direction, and the number of cameras.

The camera layout determination support device 100 consists of a camera layout need table preparation unit T1, a clustering unit T2 and a temporary layout adjustment unit T3. The camera layout need table preparation unit T1 prepares a need table that is a data set of a plurality of arrangement candidate cameras which satisfy the customer request 10 from the customer request 10 including the surveillance layout. The clustering unit T2 prepares a map based on the surveillance layout, calculates an arrangement of the arrangement candidate cameras on the map using a clustering method based on the need table and prepares a temporary layout of the camera layout. The temporary layout adjustment unit T3 determines an arrangement layout 20 of the cameras in the surveillance layout based on the temporary layout.

More specifically, the camera layout need table preparation unit T1 is a processing unit that transforms the customer request 10 into a data set of a multidimensional vector. The clustering unit T2 is a block which divides a set of the multidimensional vector into subsets (clusters), executes clustering so that a data included in respective subsets has a common characteristic (ideally), and determines a temporary layout of the camera layout. In the clustering unit T2, a type and a position of a camera are calculated. The temporary layout adjustment unit T3 is a block which adjusts the camera layout in the temporary layout and determines a final camera layout. Specifically, the temporary layout adjustment unit T3 determines a direction of the arranged camera based on a rule determined in advance, and reduces the number of cameras so as to satisfy the customer request 10. Thus, the direction and the number of cameras are calculated. In addition, the temporary layout adjustment unit T3 has a function to determine the arrangement layout of the cameras by transforming the temporary layout containing information of a map used in the clustering and an arrangement of arrangement candidate cameras on the map into the arrangement layout 20 of the cameras in an actual surveillance layout.

Next, an explanation will be given in detail of the camera layout need table preparation unit T1 shown in FIG. 1 using FIG. 2. The camera layout need table preparation unit T1 inputs the customer request 10 and outputs a need table D70. Here, the customer request 10 includes a surveillance layout D10, an area & desired function D20, an image resolution D30, or the number of surveillance cameras D40. The surveillance layout D10 is an actual layout where a surveillance camera system is installed. The area & desired function D20 is information of a given area in the surveillance layout D10 and a surveillance function that a camera conducting surveillance on the area should have. The surveillance function is not only an image recognition function, such as, a motion detect, a face detect, a staying detect and a tempering detect, but may also be a voice recognition function, a sensor function, and an authentication function. The image resolution D30 is, for example, an image resolution, an image angle and sensitivity of a camera. The number of surveillance cameras D40 is the number of cameras that a customer desires to install in the surveillance layout D10. It is noted that, as the customer request 10, the surveillance layout D10 is essential, however, the area & desired function D20, the image resolution D30 and the number of surveillance cameras D40 are optional functions that maybe omitted if they are not specifically required. Meanwhile, a case that the area & desired function D20 is not specifically required corresponds to the case that a specific image recognition function is not used and only a whole area in the surveillance layout D10 is recorded. The need table D70 is a data set of arrangement candidate cameras which expresses the customer request 10 by a multidimensional vector consisting of an area vector and a desired function vector.

The camera layout need table preparation unit T1 includes a layout labeling unit T21, a customer request table preparation unit T22 and an arrangement candidate camera data set generation unit T23. The layout labeling unit T21 is a processing unit that prepares an area layout (map) D50 for the clustering. The customer request table preparation unit T22 is a processing unit for generating a customer request table D60 that is a data set expressing the area & desired function D20 by a vector expression. The arrangement candidate camera data set generation unit T23 is a processing unit for generating the number of multidimensional vector data sets (data sets of arrangement candidate cameras) identical to the number of cameras required for the need table 70.

Figure 2:
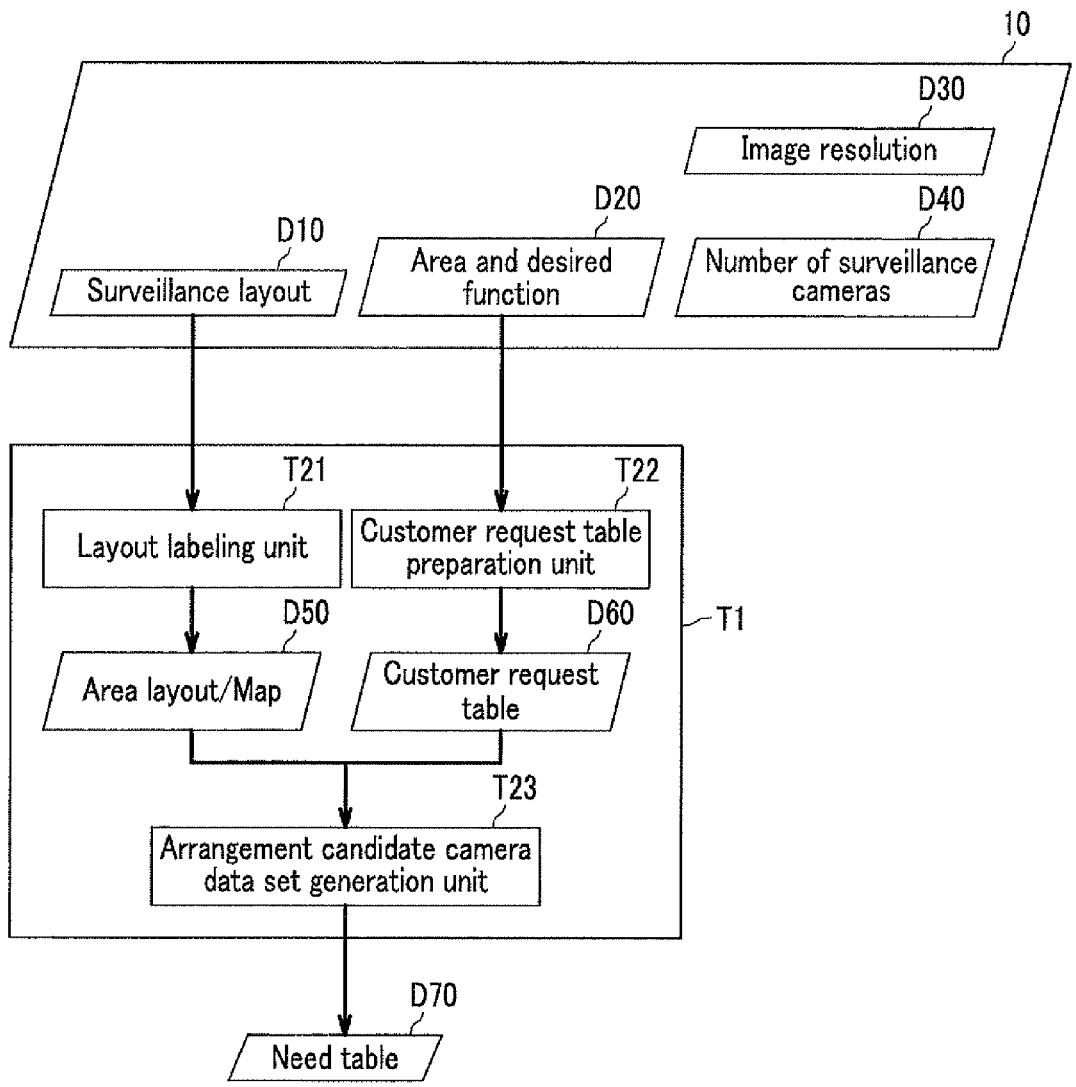
FIG. 2 is a block diagram of a camera layout need table preparation unit.
Figure 3A:
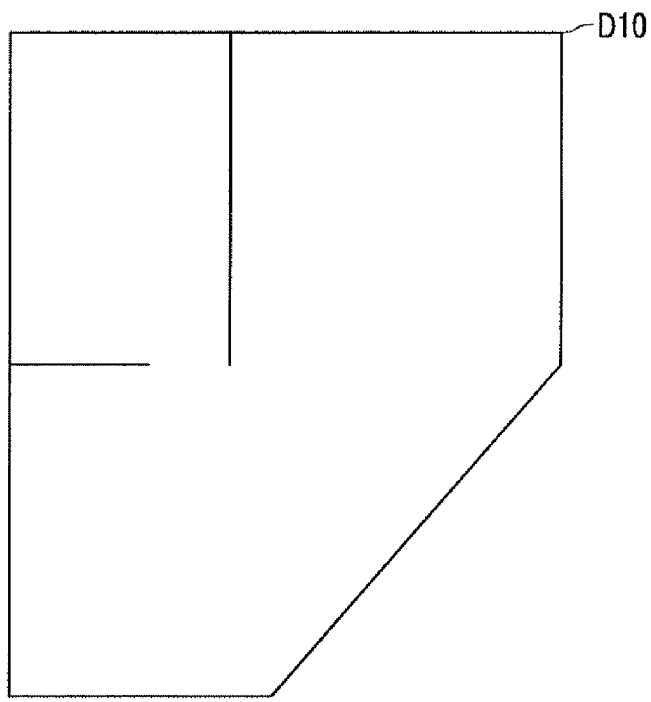
FIG. 3A and FIG. 3B are illustrations showing a relationship between a surveillance layout and an area layout.
Figure 3B:
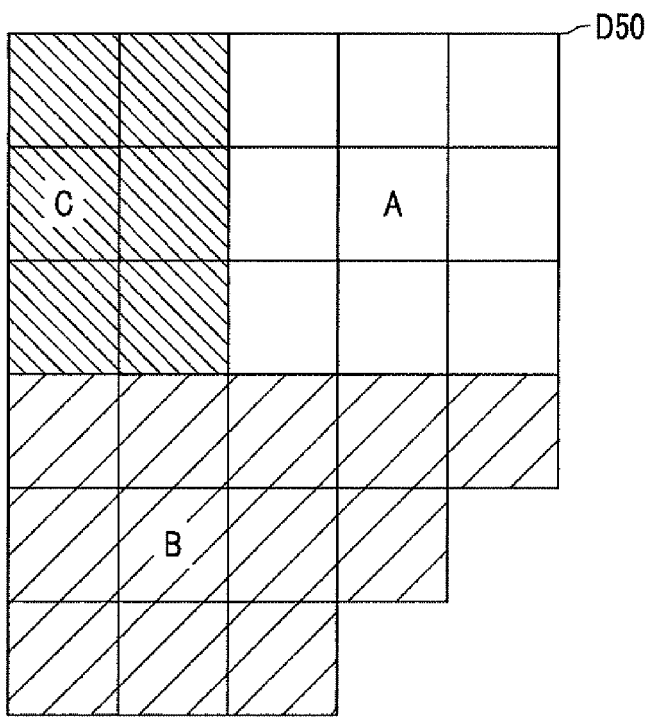

FIG. 3A and FIG. 3B are an input data and an output data of the layout labeling unit T21 shown in FIG. 2. The layout labeling unit T21 inputs the surveillance layout D10 and outputs the area layout D50. The area layout D50 corresponds to a map used for a clustering described later. The surveillance layout D10 is a bird's-eye view of an actual layout where the surveillance camera system is installed. The area layout D50 is a two-dimensional layout to be used for the clustering which is divided into a plurality of small areas as shown in FIG. 3B and a pixel classification processing is conducted by numbering a set of pixels on the image, which is called a labeling. The two-dimensional layout is the one drawing grid lines on the surveillance layout, and as a grid interval becomes narrower, an accuracy of camera arrangement becomes higher. The grid interval is set to be an appropriate value in consideration of a size of the surveillance layout. The area is divided according to the customer request, and, for example, the area may be divided into respective rooms. Each of the divided areas is labeled, for example, as A, B, C and so on.

In the embodiment, the surveillance layout D10 is input by reading a drawing of a floor plan. However, as another method, for example, a method that a user writes the layout on a GUI (Graphical User Interface) screen may be adopted.

Next, using FIG. 4A and FIG. 4B, an explanation will be given in detail of one example of the area & desired function D20 and the customer request table D60 shown in FIG. 2. Here, the area & desired function D20 and the customer request table D60 are the input and the output of the customer request table preparation unit T22, respectively.

The area & desired function D20 is data summarizing a function required for conducting surveillance on an area, for example, a motion detect, a face detect, a staying detect and a tempering defect. The area & desired function D20 lists up areas in the surveillance layout D10 (or area layout D50) and a desired detection function in each of the areas. FIG. 4A is an example of the case that the motion detect is conducted in a whole area A as "Request 1", the face detect is conducted only in an area B as "Request 2" and the staying detect is conducted only in an area C as "Request 3". Meanwhile, the area is expressed by an area label (A, B, C) that is explained before.

On the other hand, the customer request table D60 is, as shown in FIG. 4B, a data set where the area & desired function D20 is configured by the area label and a vector that expresses the desired function by "1" or "0". The desired function is expressed by binary by assigning "1" when the desired function of a request, for example, the motion detect is desired and assigning "0" when the motion detect is not desired, for each area. The assignment is conducted for all request items in the area and in desired function D20. In the foregoing description, an example of the case where only the area & desired function D20 are input is shown, however, the image resolution D30 may also be input additionally. In this case, the additional input can be conducted by adding a column of "high resolution image" in the customer request table D60. In addition, in the case that a specific function such as the motion detect is unnecessary and just a recording is sufficient, the area & desired function D20 may be omitted. In this case, it is sufficient if all fields of the desired function of the customer request table D60 are set to "0", or if a column of "recording" is added to the customer request table D60 and a field of the column is set to "1". Otherwise, a request of "recording" may be set in all areas without omitting the area & desired function D20.

As another configuration, the camera layout determination support device 100 may have a GUI screen in order to input a customer request. On the GUI screen, the labeling can be conducted by displaying the surveillance layout D10 and indicating an area on the screen. In addition, a customer can arrange a simulated camera icon on a layout, then, it is possible to set up the arranged layout as an initial layout of the clustering. In addition, the customer request 10 may be input not only by text but also by selection from options.

Next, using FIG. 5, an explanation will be given of the arrangement candidate camera data set generation unit T23 shown in FIG. 2. The arrangement candidate camera data set generation unit T23 inputs the area layout D50 and the customer request table D60, and outputs the need table D70. The arrangement candidate camera data set generation unit T23 associate area information of the area layout D50 with the area information of the customer request table D60, and calculates the number of cameras that can cover the area. For example, the area is divided by a viewing scope area of a single camera, and the number of cameras required for the area is calculated. Since this method is an approximate estimation, the number of the cameras should be estimated to be more than that of the calculation. This is conducted for all areas of the customer request table D60. The arrangement candidate camera data set generation unit T23 generates data sets of multidimensional vector of the arrangement candidate cameras equal to the number of the cameras that can cover the area, for each of the areas. The multidimensional vector consists of two types of vectors, that is, an area vector and a desired function vector. The area vector indicates a surveillance area of an arrangement candidate camera, and the desired function vector indicates a surveillance function of an arrangement candidate camera.

One example is shown in FIG. 5. Candidate cameras (1), (2), (3) are arrangement candidate cameras corresponding to areas A, B, C of the customer request table D60. The area vector of the arrangement candidate camera is set to "1" if the area corresponds, and set to "0" if the area does not correspond. In the example of FIG. 5, if estimate of the number of cameras is two in area A, three in area B and two in area C, resulting in seven in total, four arrangement candidate cameras (4), (5), (6), (7) in total, that is, one in area A, two in area B and one in area C are added in order to cover each of the areas. The arrangement candidate camera to be added is generated by copying a value of an arrangement candidate camera corresponding to each of area A, area B and area C of the customer request table D60.

However, when the clustering is conducted, multidimensional vectors each of which has entirely the same vector elements are assumed as the same data. Therefore, values of the area vectors of the arrangement candidate cameras (4), (5), (6), (7) are obtained by copying the values of the area vectors of the arrangement candidate cameras based on the customer request table D60, and the values of the desired function vectors are changed by the following method. For example, in the same area A, when a multidimensional vector of the added arrangement candidate camera (4) is generated from the arrangement candidate camera (1) based on the customer request table D60, if the area vector and the desired function vector are both "0", the value of (1) is copied, and if the desired function vector is "1", a value between 0.9 to 1 is randomly set in order to generate the added vector (4). In this case, a random value should be selected so that multidimensional vectors each of which has entirely the same vector elements are not generated. The same operation is conducted for the remaining areas, and data sets of a multidimensional vector equal to the number of the cameras that can cover all areas are output to the clustering unit T2 as the need table D70. As described above, the number of the arrangement candidate cameras that can cover the surveillance layout 20 is calculated, and by preparing a given number of data sets (in this case, equal to the number of arrangement candidate cameras that can cover the surveillance layout 20) where an arrangement candidate camera, an area on the surveillance layout 20 and a desired function in the area are associated with each other, the need table D70 that is a data set of a plurality of arrangement candidate cameras which satisfy the customer request 10 is prepared.

Figure 6:
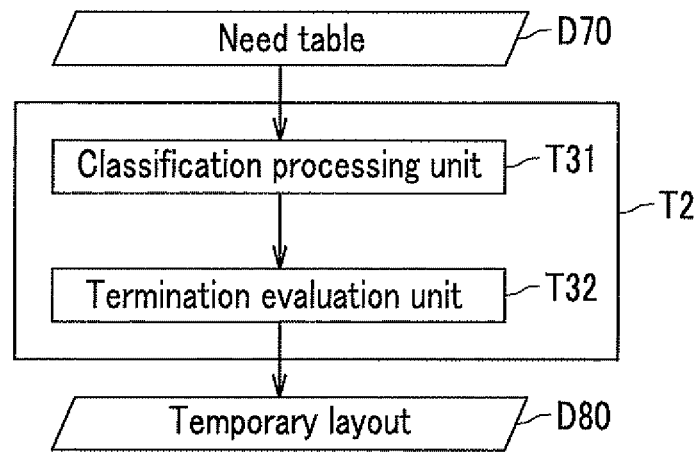
FIG. 6 is a block diagram of a clustering unit.

Next, using FIG. 6, an explanation will be given in detail of the clustering unit T2 shown in FIG. 1 The clustering unit T2 derives a temporary layout by clustering multidimensional vectors of arrangement candidate cameras. The clustering unit T2 inputs the need table D70 and outputs the temporary layout D80. The clustering unit T2 consists of a classification processing unit T31 and a termination evaluation unit T32. The classification processing unit T31 is a processing unit for executing the clustering of a data set. The termination evaluation unit T32 is a block for evaluating whether or not the classification processing unit T31 satisfies a termination condition. When the classification processing unit T31 satisfies the termination condition, the termination evaluation unit T32 outputs the temporary layout D80 to the temporary layout adjustment unit T3, and when the classification processing unit T31 does not satisfy the termination condition, the clustering processing of the classification processing unit T31 is repeated. As an example of the classification processing unit T31, a self organization map is used in the embodiment.

As the clustering method in the embodiment, the self organization map (Self Organization Map, hereinafter, referred to as SOM) is used. SOM inputs an input layer and outputs a competitive layer, where the clustering was executed. The input layer is a high-dimensional data space where a dimension can be set freely, and the competitive layer is a map space in which a node having a reference vector that has the same dimension with the input layer is arranged on a multidimension where a dimension can be set freely. Generally, a two-dimension or three dimension data space which is easily viewable visually is used for the competitive layer. In SOM, nodes having a similar character (reference vector) perform a cluster formation on the competitive layer through a no-teacher leaning, a so-called neighborhood learning. By repeating the neighborhood leaning a predetermined number of times, similar data in the input layer are mapped in the vicinity with each other, and the clustering can be performed. In addition, in SOM, a relationship among the input data can be expressed by configuring the competitive layer with two-dimension.

A learning example of SOM using a two-dimensional map space of 5×5 in the competitive layer is shown in FIG. 7. In the initial state, a value of the reference vector of each node in the competitive layer is set randomly.

(1) A multidimensional vector is input from the input layer.
(2) A degree of similarity of the input vector in (1) is compared with a reference vector of each node in the competitive layer, and the node having the reference vector of the highest degree of similarity is selected as a winner node.
(3) The neighborhood learning that moves the winner node and a reference vector around the winner node closer to the input vector is executed. Specifically, the winner node is moved closer to a value of the input vector according to a predetermined learning rate. In addition, a node having a short distance from the winner node is also moved closer to the value of the input vector according to a reduced learning rate depending on the distance from the winner node.
(4) The next multidimensional vector is input from the input layer.

The foregoing procedure is repeated.

In the embodiment, the competitive layer corresponds to the area layout D50, each node of the competitive layer corresponds to one block (grid) in the area layout D50, the input layer corresponds to the need table D70, and the termination condition of the termination evaluation unit T32 corresponds to the number of learning times of the SOM. Based on a map (area layout D50) which is generated so as to correspond to the surveillance layout D10 and the need table D70, the clustering unit T2 calculates an arrangement of the arrangement candidate cameras on the map using a clustering method (in this example, SOM) and prepares the temporary layout D80 of the camera layout. Using SOM, the arrangement candidate cameras in the need table that is the input layer are mapped on the area layout D50 that is the competitive layer according to a similarity of the multidimensional vector of respective arrangement candidate cameras. Since an extent of the neighborhood learning is wide at the initial stage of the learning, the area layout varies largely. However, as with the usual SOM, the variation converges by narrowing the neighborhood with time, and the camera layout is fixed. Since the multidimensional vector includes an area vector, the surveillance camera can be arranged efficiently, while considering the surveillance layout.

In the usual SOM, a layout of the competitive layer may be rotated in a counterclockwise direction or in a clockwise direction in comparison with the original layout, or may be caused a mirror inversion that inverts top and bottom or right and left in comparison with the original layout, in some cases. The rotation and the mirror inversion of the competitive layer are correct as a learning result of SOM. However, in the case of this embodiment, the rotation and the mirror inversion are not desirable since the rotation and the mirror inversion of the surveillance layout never happen. In order to prevent the rotation and the mirror inversion, two limiting conditions are applied to the usual SOM in the embodiment.

A first limiting condition is that in the usual SOM, although an initial value of the reference vector of the competitive layer is randomly set, in the present method, the initial value is set to a value so that the area layout D50 corresponds to a node of the competitive layer. Specifically, when an area is expressed by a vector expression, the own area is set to "1", a neighboring other area is set to "0.5", and a non-neighboring area is set to "0". If the above rule is applied to the layout consisting of the areas A, B and C, a relation between a node and an area shown in FIG. 8A can be obtained. If the relation is labeled in the area layout D50, FIG. 8B is obtained. As described above, the map is generated so as to correspond to the surveillance layout D10 (area layout D50). This method not only prevents the foregoing rotation and mirror inversion, but also reflects a character of an actual surveillance layout much more on the area vector of the competitive layer. In addition, if there exists a wall in the boundary of areas, a neighboring another area is set to "0" in order to express that the areas are disconnected to each other. Meanwhile, in FIG. 8B, a case of no wall is shown for easy understanding. In the present embodiment, the area vector is expressed with simple values of "1", "0.5" and "0", however, the actual surveillance layout can be reproduced in detail by expressing the area vector with a fuzzy set.

Figure 9:
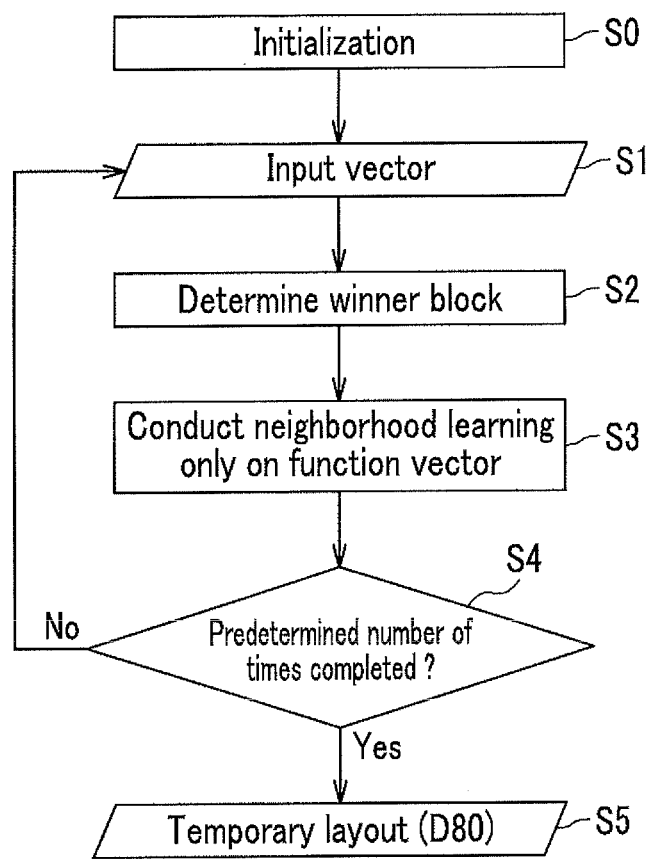
FIG. 9 is a processing flowchart of SOM in the present invention.

A second limiting condition is applied to the neighborhood learning. Using FIG. 9, an explanation will be given of a processing flow of SOM in the present embodiment. In S0, a reference vector in each block of the area layout D50 is initialized. In the reference vector, a value of area vector is set to the value set in the area layout D50, and a value of desired function vector is randomly determined (S0). In S1, a multidimensional vector of arrangement candidate camera is input from the need table D70. In S2, a distance between the input vector and a reference vector in each block of the area layout D50 is calculated. The shortest distance, that is, a block having a high degree of similarity among the blocks in the area layout D50 becomes a winner, and an arrangement candidate camera is arranged in the block. In S3, the neighborhood learning is executed on the winner block and the blocks around the winner block. In the neighborhood learning, the learning is executed on all reference vectors in the usual SOM and the values are updated. However, in the present method, the learning is not executed on an area vector of the reference vector that consists of the area vector and a desired function vector, and the data thereof is not updated. Then, the reference vector consists of two types of feature vectors that are an updatable reference vector and a non-updatable vector. Since the initial value of the area vector of the competitive layer is maintained by the foregoing learning method, the rotation and the mirror inversion are prevented even if the learning progresses, and a character of the surveillance layout is maintained. When the learning from S1 to S3 is executed for all candidate cameras in the need table D70, one learning round is completed. In S4, if the learning from S1 to S3 is repeated yet less than a predetermined number of times ("NO"), then the flow goes to S1. If the learning is repeated a predetermined number of times ("Yes"), then the temporary layout D80 is obtained.

Since an installation area of arrangement candidate cameras in the need table D70 is limited to the area set by the initial value of the reference vector by two conditions, that is, fixing of the area vector and limitation of the neighborhood learning, the camera layout corresponding to the surveillance layout can be generated.

As with the case of usual SOM, in order to avoid emerging of a super block that becomes a winner block against any input layer and causes insufficient learning, a limiting condition that any block of competitive layer can become a winner block only once during one round of input of the need table is added. In addition, a further limiting condition that a block within a proper neighborhood from the winner block can not become a winner block in the learning of the round is added. If the proper neighborhood from the winner block is set as a covering area of the surveillance camera, the arrangement candidate cameras are prevented from being too close to each other.

In consideration of a visual filed of a camera, it is better that the camera is installed against and closer to the wall rather than the center. Therefore, the proper neighborhood of the neighborhood learning is set narrower on the layout center side and set wider on the layout end side so that a block closer to the wall among the blocks of the area layout D50 is likely to become a winner block. The learning progresses on the layout end side that has a wider proper neighborhood, and the layout end side is likely to win. On the other hand, the learning does not progress on the layout center side that has a narrower proper neighborhood, and the layout center side becomes hard to win.

In addition, when surveillance cameras having different visual fields are used in mixture, it is efficient to cover the area if a camera having a wider visual filed and a camera having a narrower visual field are used in combination. If there are two types of visual fields, an item of visual field is added to the need table D70. For example, if the visual filed is wide, "1" is assigned, and if narrow, "0" is assigned. When the learning is at the initial stage, the learning is conducted only by an arrangement candidate camera having the visual field of "1", and the learning is continued until a camera layout of the wide visual field is approximately fixed. After that, the learning is conducted using all arrangement candidate cameras. Then, cameras having the narrower visual filed can be easily arranged among the cameras having the wider visual field. As described above, by changing a learning condition with time, the cameras having different visual fields can be arranged so as to efficiently cover the area.

Other than the above example, a combination arrangement of cameras having different visual fields can also be applied to the case including a camera having a high priority. The high priority camera which photographs, for example, a face is arranged in advance and cameras having a wider visual field are arranged in the remaining space, then, the cameras can be arranged so as to efficiently cover the area.

In the foregoing embodiment, a procedure of online leaning style is shown. However, since a multidimensional vector of the input layer does not change during the learning, batch learning may also be used.

Next, an explanation will be given of the temporary layout adjustment unit T3 shown in FIG. 1, using FIG. 10A. and FIG. 10B. The temporary layout adjustment unit T3 inputs the number of surveillance cameras D40 and the temporary layout D80 where the arrangement candidate cameras are arranged, and outputs the arrangement layout 20. Meanwhile, the number of surveillance cameras D40 may be omitted. The temporary layout adjustment unit T3 determines the arrangement layout 20 of the cameras in the surveillance layout D10 based on a predetermined rule including at least a camera direction rule and the temporary layout D80.

Figure 10A:
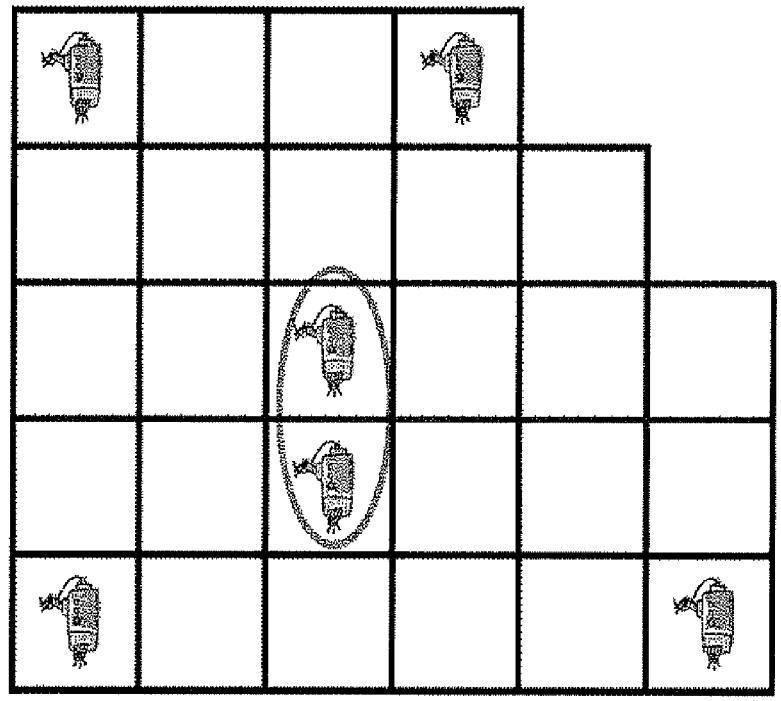
FIG. 10A and FIG. 10B are illustrations showing a camera consolidation in a temporary layout adjustment unit.
Figure 10B:
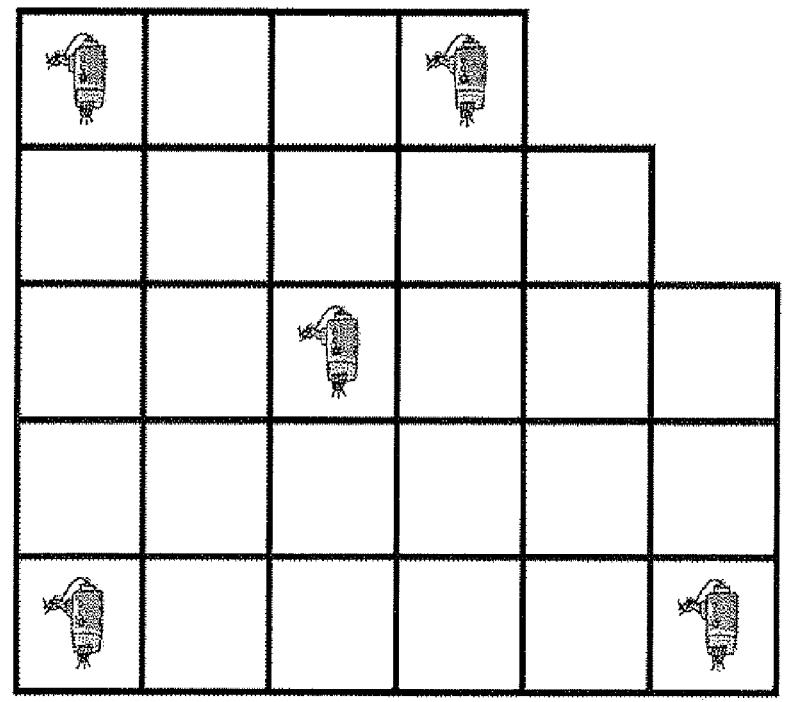

For example, when a temporary layout shown in FIG. 10A is obtained, as shown in FIG. 10B, a combination of two cameras having a shortest distance among the cameras is replaced by one camera. This process is continued until the number of the cameras reaches the number of surveillance cameras D40. Or, the replacement is continued until the combination of cameras, where a distance between the cameras is shorter than a predetermined distance, disappears.

In addition, a camera direction is determined by the following order of priority in order to maximize coverage of camera in the block where an arrangement candidate camera exists on the temporary layout D80.

Rule 1: a direction opposite to a block which is the most distant among eight neighbors Rule 2: a direction toward the layout center The reason of the Rule 1 is that the most distant block is likely to be a wall and a direction opposite to the wall has a larger viewing field of the camera. The reason of the Rule 2 is that the direction toward the layout center generally has a wider viewing angle. A layout after completing the foregoing processing is output as the arrangement layout 20. A block where an arrangement candidate camera does not exist on the temporary layout D80 is covered by the nearest neighbor camera.

In the present embodiment, SOM is used for the clustering. However, the clustering can also be conducted by using a clustering method having a function of vector quantization, for example, a neural network. In this case, as with the case of SOM, the reference vector consists of two types of feature vectors that are an updatable reference vector and a non-updatable reference vector. In the neural network, the area layout D50 and the need table D70 are prepared by a procedure similar to that of SOM. Multidimensional vectors of arrangement candidate cameras in the need table D70 are sequentially input, and as with the case of SOM, a distance between the input vector and a reference vector in each block of the area layout D50 is calculated. Each block is ranked in ascending order of the distance between the block and the input vector. The reference vector of the each block learns so that a learning amount decreases according to the ranking order. The learning proceeds so as to approach the input multidimensional vector. As with the present embodiment, only a desired function vector conducts the learning. The learning is repeated a predetermined number of times. In addition, other than SOM and the neural network, a general algorithm which can form a cluster from a similarity and information of geometric arrangement between the input vectors may be applied. According to the present embodiment, a camera layout which satisfies a customer request can be automatically prepared based on the customer request including a surveillance layout, thereby, a determination of the camera layout can be supported. In addition, for example, through a consolidation of cameras, a camera layout which is optimum for the surveillance need of the customer and has the minimum configuration can be determined.

[Embodiment 2]

Figure 11:
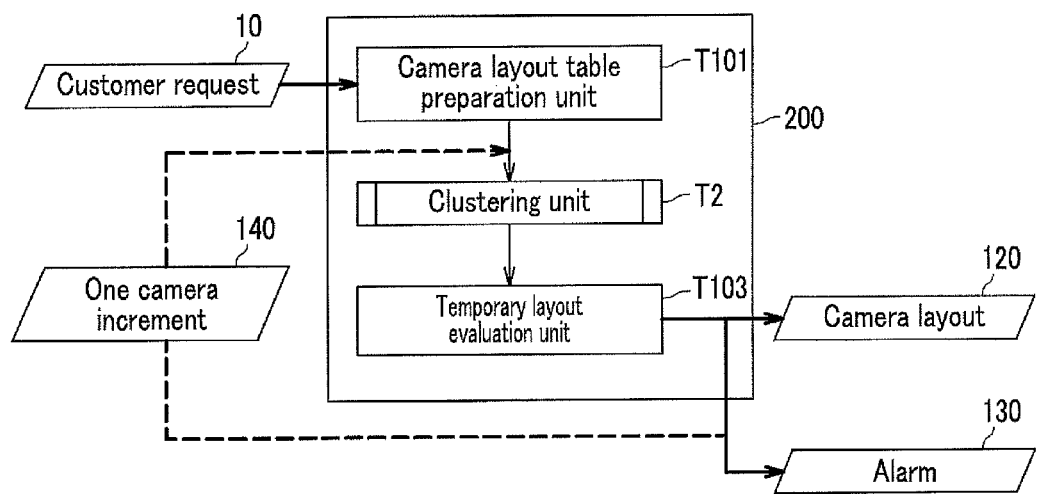
FIG. 11 is a block diagram showing EMBODIMENT 2 of a camera layout determination support device.

FIG. 11 is a block diagram showing one example of EMBODIMENT 2 of a camera layout determination support device. The camera layout determination support device of EMBODIMENT 2 is the one that changed a part of the camera layout determination support device of EMBODIMENT 1. With respect to a function block level, the clustering unit T2 is identical to that of EMBODIMENT 1, while a camera layout table preparation unit T101 and a temporary layout evaluation unit T103 are different from corresponding units of EMBODIMENT 1. A camera layout determination support device 200 inputs the customer request 10 and outputs a camera layout 120 of surveillance cameras and an alarm 130. The customer request 10 is identical to that of EMBODIMENT 1, and the camera layout 120 is a layout that arranges surveillance cameras equal to the number of surveillance cameras D40 in the customer request 10. The alarm 130 issues an alarm when an area of non-covered viewing field is larger than a predetermined value in the arrangement of surveillance cameras of the camera layout 120.

The camera layout determination support device 200 consists of the camera layout table preparation unit T101, the clustering unit T2 and the temporary layout evaluation unit T103. The camera layout table preparation unit T101 is a processing unit for preparing a data set of an arrangement candidate camera that is expressed by a multidimensional vector from the customer request 10. In this regard, the camera layout table preparation unit T101 is a kind of the camera layout need table preparation unit T1. However, when the data set is prepared, no consideration is given to a visual field of the camera and data sets equal to the number of surveillance cameras D40 are prepared. The temporary layout evaluation unit T103 is a processing unit for evaluating effectiveness of a camera layout in consideration of covering area of the arranged cameras.

Figure 12:
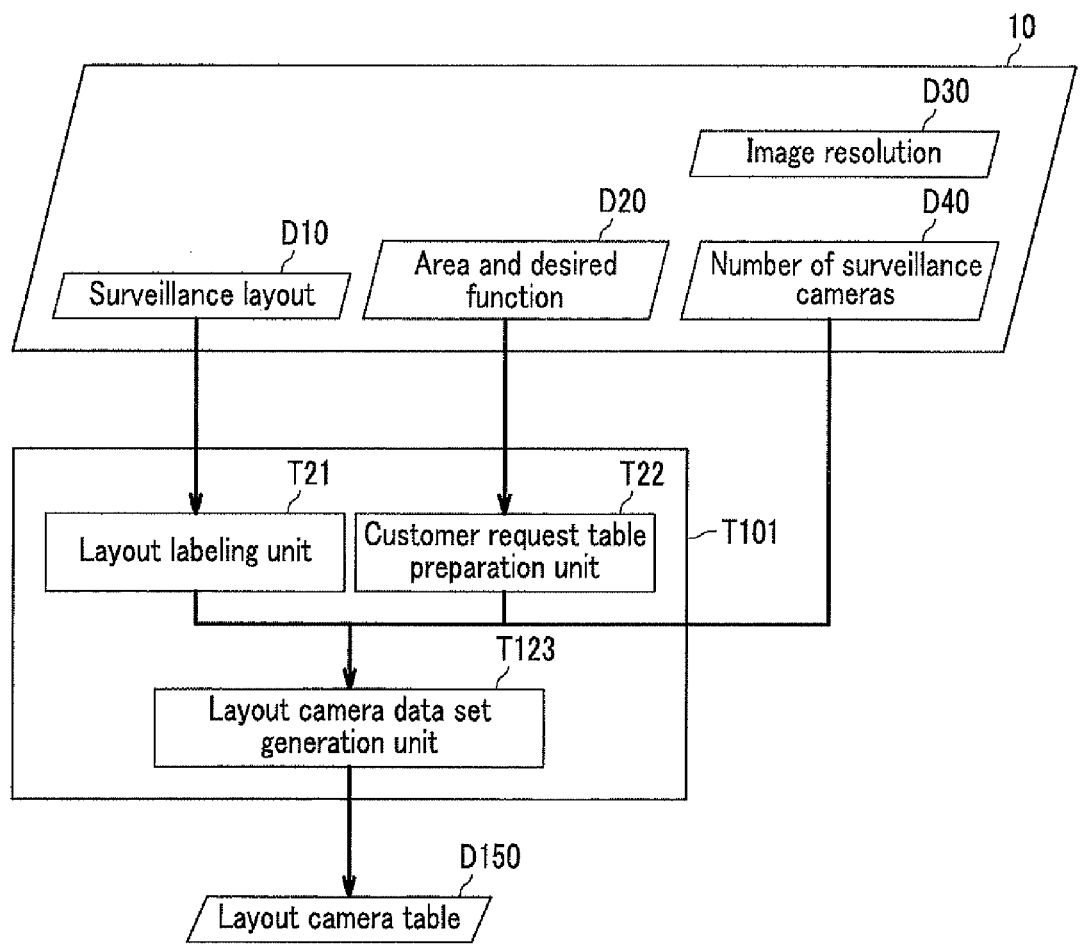
FIG. 12 is a block diagram of a camera layout table preparation unit.

Next, using FIG. 12, an explanation will be given in detail of the camera layout table preparation unit T101 shown in FIG. 11. The camera layout table preparation unit T101 inputs the customer request 10 and outputs a layout camera table D150. The layout camera table D150 is a kind of the need table D70. A difference of the layout camera table D150 from the need table D70 is that the number of arrangement candidate cameras (layout cameras) is limited to the number of the surveillance cameras D40. The camera layout table preparation unit T101 consists of the layout labeling unit T21, the customer request table preparation unit T22 and a layout camera data set generation unit T123. The layout labeling unit T21 and the customer request table preparation unit T22 are identical to those of EMBODIMENT 1. The layout camera data set generation unit T123 is a processing unit which associates the customer request table D60 with the area layout D50, and prepares data sets of multidimensional vector equal to the number of surveillance cameras D40 without considering a visual field of the camera.

Next, an explanation will be given in detail of the layout camera data set generation unit T123 shown in FIG. 12. The layout camera data set generation unit T123 inputs the number of surveillance cameras D40, the area layout D50 and the customer request table D60 and outputs the layout camera table D150. As with EMBODIMENT 1, the layout camera data set generation unit T123 associates area information of the area layout D50 with the area information of the customer request table D60. When the number of surveillance cameras D40 is larger than the number of areas in the customer request table D60, a multidimensional vector of the added arrangement candidate camera is generated for each area using a method similar to that of EMBODIMENT 1 until the number of surveillance cameras D40 and the number of arrangement candidate cameras become equal to each other. However, it is unnecessary to estimate the number of arrangement candidate cameras that can cover the area as conducted in EMBODIMENT 1, and it is enough if the arrangement candidate camera is added so as to reach the upper limit of the number of arrangement candidate cameras by randomly selecting the area. Therefore, the number of the arrangement candidate cameras may become more than that of EMBODIMENT 1, or may become less than that of EMBODIMENT 1, depending on the case. Meanwhile, when the number of surveillance cameras D40 is smaller than the number of areas in the customer request table D60, it is enough if a multidimensional vector of the arrangement candidate camera is generated until the number of the arrangement candidate cameras reaches the upper limit thereof by selecting the area randomly, or selecting the area sequentially from the area A. When the number of surveillance cameras D40 is equal to the number of areas in the customer request table D60, the need table D70 becomes identical to the section of "arrangement candidate camera based on customer request table" in FIG. 5.

The temporary layout evaluation unit T103 inputs a temporary arrangement layout and outputs a camera layout 120 of surveillance cameras and the alarm 130. The temporary layout evaluation unit T103 is a kind of the temporary layout adjustment unit T3 because the temporary layout evaluation unit T103 determines an arrangement layout of the cameras in the surveillance layout based on the temporary arrangement layout (a kind of temporary layout D80) that is an output of the clustering unit T2. A camera direction is acquired in a manner similar to that of EMBODIMENT 1, and is output as the camera layout 120 (a kind of arrangement layout of cameras). When the number of nodes which are not covered is not less than a predetermined threshold value based on the covering area of the cameras arranged on the temporary arrangement layout, ineffectiveness of the camera layout is notified by the alarm.

Or else, as shown by a dotted line in FIG. 11 as another configuration, one camera increment 140 may be inputted to the clustering unit T2 as an additional request, and the clustering is executed again, and this procedure may be repeated until the number of cameras becomes equal to the predetermined threshold value.

As described above, the temporary layout evaluation unit T103 (a kind of temporary layout adjustment unit T3) evaluates the camera layout 120 (a kind of arrangement layout 20 of EMBODIMENT 1) based on the covering area of the cameras, and feedbacks a recommended number of cameras or effectiveness of the camera layout to the customer.

According to the present embodiment, even if the number of surveillance cameras D40 which is requested by the customer is not enough, a surveillance layout where the surveillance is conducted by the cameras close to the number of surveillance cameras D40 requested by the customer can be obtained.

[Embodiment 3]

Figure 13:
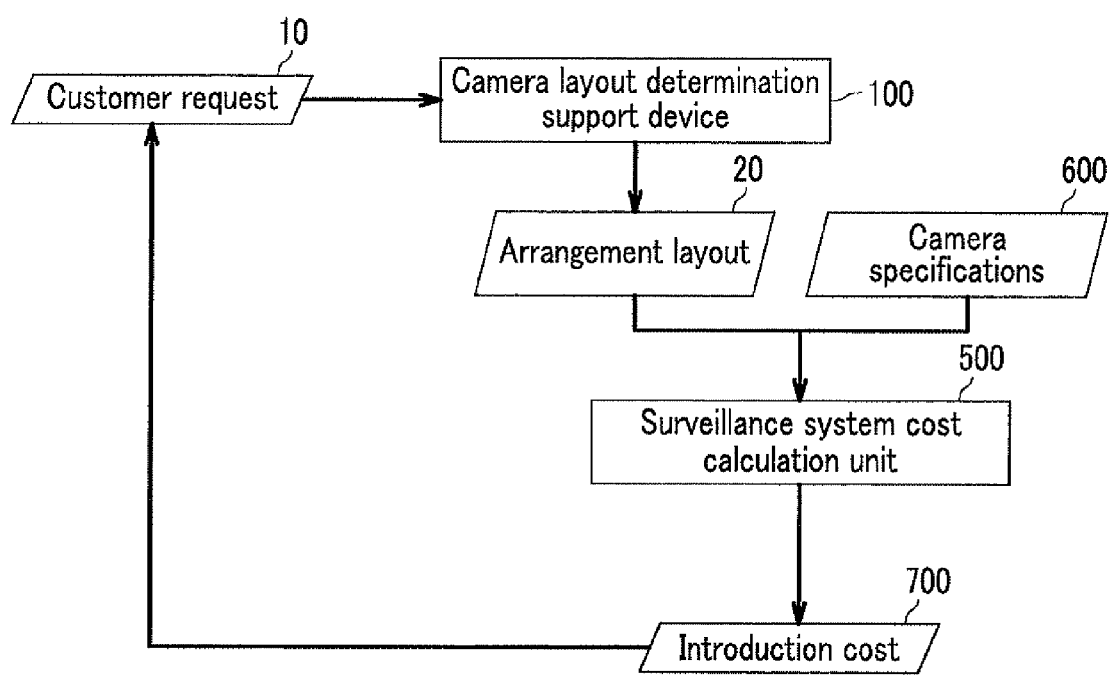
FIG. 13 is a block diagram showing one example of application of a camera layout determination support device.

FIG. 13 is a block diagram showing one example of EMBODIMENT 3 of a device according to the present invention. The camera layout determination support device 100 inputs the customer request 10 and outputs the arrangement layout 20 of surveillance cameras that satisfies the customer request 10. The customer request 10 and the arrangement layout 20 are identical to those of EMBODIMENT 1. Meanwhile, item of introduction cost may be added in the customer request 10.

A surveillance system cost calculation unit 500 calculates a total cost of a surveillance system of the present embodiment. The surveillance system cost calculation unit 500 inputs the arrangement layout 20 as well as camera specifications 600 and outputs an introduction cost 700. The camera specifications 600 are data of, for example, a surveillance function, a visual field and a price of a camera, and the introduction cost 700 is a total cost for constructing the surveillance system. When the viewing field is covered excessively, or when the number of cameras is not enough, the introduction cost 700 may transmit a message requiring a decrease or increase of the cost to the customer request 10.

Since the number of cameras to be required can be estimated in detail from the number of surveillance cameras D40 of the customer request 10 by executing the clustering, the introduction cost can be calculated, and the number of cameras can be re-estimated by changing the customer request 10.

The explanation has been given using the embodiments of the present invention. However, the feature that has been explained in each of the embodiments is just one example, and the present invention can be modified without departing from the sprit and nature of the present invention. In addition, the feature explained in each of the embodiments may be used in combination as long as the features do not conflict to each other.

According to a camera layout determination support device of the present invention, for example, the camera layout determination support device may be applied to an installer of a surveillance camera, a security camera and the like.

What is claimed is:

1. A camera layout determination support device for supporting a determination of a layout of cameras that conduct surveillance on a surveillance area, comprising:
    a need table preparation unit that generates a need table which is a data set including data of candidate cameras to be arranged, desired camera functions satisfying customer requests, and customer-defined small areas into which the surveillance area is divided; and
    a clustering unit that clusters data sets including the need table, and generates temporary position data of the candidate cameras to be arranged, wherein
    the need table preparation unit
    receives data of a surveillance layout including the customer-defined small areas, divides the surveillance area into blocks using grids, and generates a map in which each of the customer-defined small areas is divided into a plurality of the blocks; and
    receives data of customer requests including desired camera functions for each of the small areas,
    generates a customer request table that is data concerning whether or not each of the desired functions is necessary for each of the small areas, associates the customer request table with the map, and calculates a number of necessary cameras to be arranged according to the customer request table and the map in order to generate the need table; and
    the clustering unit receives the data sets including the map and the need table, labels the block using an area vector described using a fuzzy set, and clusters the data sets including the map and the need table, in order to generate the temporary position data of the candidate cameras to be arranged.

2. The camera layout determination support device according to claim 1, further comprising:
    a temporary layout adjustment unit that determines an arrangement layout of the cameras in the surveillance layout based on a predetermined rule including at least a camera direction rule and the temporary layout.

3. The camera layout determination support device according to claim 1,
    wherein the clustering unit is configured to use a self organization map comprising two types of feature vectors that are an updatable reference vector and a non-updatable reference vector.

4. The camera layout determination support device according to claim 3,
    wherein the feature vectors express the desired function as the updatable reference vector and an area on the surveillance layout as the non-updatable reference vector.

5. The camera layout determination support device according to claim 3,
    wherein in the self organization map, the non-updatable reference vector of a competitive layer is expressed with a form reflecting characteristics of a boundary between the areas including a wall in the surveillance layout.

6. The camera layout determination support device according to claim 3,
    wherein the clustering unit is configured, at an initial stage to use for the updatable reference vector, the self organization map expressed by a randomly set value, and to use for the non-updatable reference vector, the self organization map expressed by the value reflecting the surveillance layout.

7. The camera layout determination support device according to claim 1,
    wherein the clustering unit is configured to use a self organization map which has a function to intentionally form a block that is easy to win by modifying data on a shape of a neighborhood area during learning.

8. The camera layout determination support device according to claim 1,
    wherein the clustering unit is configured to use a self organization map which has a function to intentionally control the arrangement of the cameras by limiting a selection rule of a winner node during learning.

9. The camera layout determination support device according to claim 1,
    wherein the clustering unit is configured to perform vector quantization of two types of feature vectors that are the updatable reference vector and the non-updatable reference vector.

10. The camera layout determination support device according to claim 1,
    wherein when a plurality of the arrangement of candidate cameras having different visual coverages are arranged, the clustering unit changes a learning condition of the clustering unit with time.

11. The camera layout determination support device according to claim 1,
    wherein the clustering unit is configured to update position data of the candidate cameras to be arranged on the map, while changing a learning condition during repetitive learning.

12. The camera layout determination support device according to claim 2,
    wherein the temporary layout adjustment unit feedbacks a recommended number of the cameras or effectiveness of the camera layout to a customer by evaluating the arrangement layout based on a covering area of the cameras.

13. The camera layout determination support device according to claim 1, further comprising:
    a surveillance system cost calculation unit that calculates a total cost of a surveillance system from the arrangement layout and camera specifications in order to feedback the total cost to a customer.

14. The camera layout determination support device according to claim 1,
  wherein the customer request includes at least one of a resolution of camera image, the number of the cameras and the cost.

15. The camera layout determination support device according to claim 1,
  wherein the desired function is at least one of motion detection, face detection staying detection, mischief detection, a video recording, a voice recognition function, a sensor function, and an authentication function.

16. The camera layout determination support device according to claim 1,
  wherein the need table preparation unit calculates the number of the arrangement of candidate cameras that can cover the surveillance layout and prepares data sets of the arrangement of candidate cameras equal to the number of the arrangement of candidate cameras.

17. The camera layout determination support device according to claim 1,
  wherein the customer request includes the number of the cameras, and the need table preparation unit prepares data sets of the arrangement of candidate cameras equal to the number of the cameras set in the customer request.

* * * * *